US008831368B2

(12) United States Patent
Ryu et al.

(10) Patent No.: US 8,831,368 B2
(45) Date of Patent: Sep. 9, 2014

(54) ACM-BASED SIMULCAST TRANSMISSION AND RECEPTION APPARATUS AND METHOD

(75) Inventors: Joon Gyu Ryu, Daejeon (KR); Deock Gil Oh, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 187 days.

(21) Appl. No.: 13/423,431

(22) Filed: Mar. 19, 2012

(65) Prior Publication Data

US 2013/0051693 A1 Feb. 28, 2013

(30) Foreign Application Priority Data

Aug. 22, 2011 (KR) .................. 10-2011-0083292

(51) Int. Cl.
*G06K 9/36* (2006.01)
*G06K 9/46* (2006.01)

(52) U.S. Cl.
USPC ........................................ 382/239

(58) Field of Classification Search
CPC ............... H04N 7/26244; H04N 7/26356
USPC ........... 382/232, 233, 235, 239; 375/240.01, 375/240.02, 240.08, 240.1, 240.11, 240.16, 375/E07.001; 370/212, 217, 468; 708/250; 709/247
See application file for complete search history.

(56) References Cited

U.S. PATENT DOCUMENTS

| 6,937,770 | B1* | 8/2005 | Oguz et al. ..................... 382/235 |
| 7,010,037 | B2* | 3/2006 | Ye et al. ..................... 375/240.1 |
| 7,936,821 | B2* | 5/2011 | Suzuki ..................... 375/240.16 |
| 8,107,527 | B1* | 1/2012 | Hobbs et al. ............. 375/240.01 |
| 8,406,290 | B2* | 3/2013 | Li et al. ..................... 375/240.02 |
| 2003/0093451 | A1* | 5/2003 | Chuang et al. ................ 708/520 |
| 2006/0056451 | A1* | 3/2006 | Yano et al. .................... 370/468 |
| 2006/0111041 | A1 | 5/2006 | Karabinis |
| 2011/0235701 | A1 | 9/2011 | Kim et al. |
| 2012/0275295 | A1* | 11/2012 | Tanikawa ...................... 370/217 |
| 2013/0051693 | A1* | 2/2013 | Ryu et al. ..................... 382/239 |

FOREIGN PATENT DOCUMENTS

| JP | 05-327807 A | 12/1993 |
| KR | 20090066134 A | 6/2009 |

* cited by examiner

*Primary Examiner* — Amir Alavi
(74) *Attorney, Agent, or Firm* — Ladas & Parry LLP

(57) ABSTRACT

Provided are an adaptive coding modulation (ACM)-based simulcast transmission and reception apparatus and method. The apparatus includes a transmitter configured to analyze whether or not it is raining in a region where a receiver is present on the basis of channel state information (CSI) provided by the receiver, encode and/or modulate an image signal according to the analysis result, and provide the encoded and/or modulated image signal through a single band or multiple bands. On the basis of a result of analyzing whether or not it is raining in a region where a receiver is present, it is possible to effectively prevent signal attenuation caused by rain by providing image signals having different resolutions through multiple bands when the region is in a rainfall state.

9 Claims, 3 Drawing Sheets

(a) RAINFALL STATE (b) NON-RAINFALL STATE

ACM-BASED SIMULCAST TRANSMISSION AND RECEPTION APPARATUS AND METHOD

CLAIM FOR PRIORITY

This application claims priority to Korean Patent Application No. 10-2011-0083292 filed on Aug. 22, 2011 in the Korean Intellectual Property Office (KIPO), the entire contents of which are hereby incorporated by reference.

BACKGROUND

1. Technical Field

Example embodiments of the present invention relate in general to a transmission and reception apparatus and method, and more particularly, to an adaptive coding modulation (ACM)-based simulcast transmission and reception apparatus and method.

2. Related Art

On the basis of existing satellite-based digital broadcasting and wideband Internet service technology, a broadcasting and telecommunication convergence service enabling reception of broadcasting and communication at any time in any place according to the concept of a ubiquitous network has recently come into the limelight. Due to such an environment, active efforts are being made to ensure competitiveness by improving service quality in the international and domestic satellite broadcasting field, and a high-quality satellite broadcasting service employing digital video broadcasting-satellite second generation (DVB-S2), which is highly efficient satellite transmission technology, and H.264 video compression technology, which offers remarkable performance, is emerging. Also, as a 21 GHz $K_a$ frequency band having a wide band of 600 MHz becomes usable for broadcasting-satellite service (BSS) in Region 1 and Region 3, satellite broadcasting for providing a multi-channel high-quality high-definition television (HDTV) service will further progress.

However, unlike the $K_u$ band that has been widely used as an existing satellite broadcasting service band, the $K_a$ band is very vulnerable to rain, and has a serious problem of signal attenuation caused by rain in comparison with other bands. To solve this problem, link power control, a diversity scheme, a beamforming technique, a hierarchical transmission scheme, an ACM technique, etc. are used.

Among these techniques, the hierarchical transmission technique involves transmitting an image signal through multiple bands. A high-quality image signal to which a high-order modulation scheme and a high coding rate are applied is transmitted through one of the multiple bands, and a lower-quality image signal to which a low-order modulation scheme and a low coding rate are applied is transmitted through another of the multiple bands. Since the high-quality image signal and the low-quality image signal that can be received in the rain are simultaneously transmitted through the multiple bands, it is possible to prevent signal attenuation caused by rain. However, the high-quality image signal and the low-quality image signal are transmitted together through multiple bands even in a non-raining region in which transmission of the low-quality image signal is unnecessary, and thus a bandwidth is not efficiently used.

SUMMARY

Accordingly, example embodiments of the present invention are provided to substantially obviate one or more problems due to limitations and disadvantages of the related art.

Example embodiments of the present invention provide an adaptive coding modulation (ACM)-based simulcast transmission and reception apparatus for preventing signal attenuation and also making better use of a bandwidth upon transmission of an image signal.

Example embodiments of the present invention also provide an ACM-based simulcast transmission and reception apparatus for preventing signal attenuation and also making better use of a bandwidth upon transmission of an image signal.

In some example embodiments, an ACM-based simulcast transmission and reception apparatus includes a transmitter configured to analyze whether or not it is raining in a region where a receiver is present on the basis of channel state information (CSI) provided by the receiver, encode and/or modulate an image signal according to the analysis result, and provide the encoded and/or modulated image signal through a single band or multiple bands.

Here, the CSI provided by the receiver may include at least one of a signal-to-noise ratio (SNR) and a carrier-to-noise ratio (CNR).

Here, the transmitter may include: an analyzer configured to analyze whether or not it is raining in the region where the receiver is present on the basis of the CSI; a generator configured to generate an image signal of which a resolution has been adjusted on the basis of an original image signal according to the analysis result of the analyzer; an encoder configured to encode and/or modulate the image signal generated by the generator according to the analysis result of the analyzer; and a transmission unit configured to provide the image signal encoded and/or modulated by the encoder through the single band or the multiple bands according to the analysis result of the analyzer.

Here, the generator may generate at least two image signals having different resolutions when the analyzer analyzes that the region where the receiver is present is in a rainfall state, and may generate one image signal when the analyzer analyzes that the region where the receiver is present is in a non-rainfall state.

Here, when the at least two image signals are generated by the generator, the encoder may apply a higher coding rate and/or a higher-order modulation scheme to an image signal having a relatively high resolution between the at least two image signals in comparison with an image signal having a relatively low resolution.

Here, the transmission unit may provide the at least two image signals through the multiple bands when the analyzer analyzes that the region where the receiver is present is in the rainfall state, and may provide the one image signal through the single band when the analyzer analyzes that the region where the receiver is present is in the non-rainfall state.

In other example embodiments, an ACM-based simulcast transmission and reception method includes: receiving CSI resulting from reception of an image signal from a receiver; analyzing whether or not it is raining in a region where the receiver is present on the basis of the CSI; generating an image signal of which a resolution has been adjusted on the basis of an original image signal according to the result of analyzing whether or not it is raining; encoding and/or modulating the image signal of which the resolution has been adjusted according to the result of analyzing whether or not it is raining; and providing the encoded and/or modulated image signal through a single band or multiple bands according to the result of analyzing whether or not it is raining.

Here, receiving the CSI may include receiving the CSI including at least one of an SNR and a CNR.

Here, generating the image signal of which the resolution has been adjusted may include generating at least two image signals having different resolutions when it is analyzed that the region where the receiver is present is in a rainfall state, and generating one image signal when it is analyzed that the region where the receiver is present is in a non-rainfall state.

Here, encoding and/or modulating the image signal of which the resolution has been adjusted may include, when the at least two image signals are generated, applying a higher coding rate and/or higher-order modulation scheme to an image signal having a relatively high resolution between the at least two image signals in comparison with an image signal having a relatively low resolution.

Here, providing the encoded and/or modulated image signal through the single band or the multiple bands may include providing the at least two image signals through the multiple bands when it is analyzed that the region where the receiver is present is in the rainfall state, and providing the one image signal through the single band when it is analyzed that the region where the receiver is present is in the non-rainfall state.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
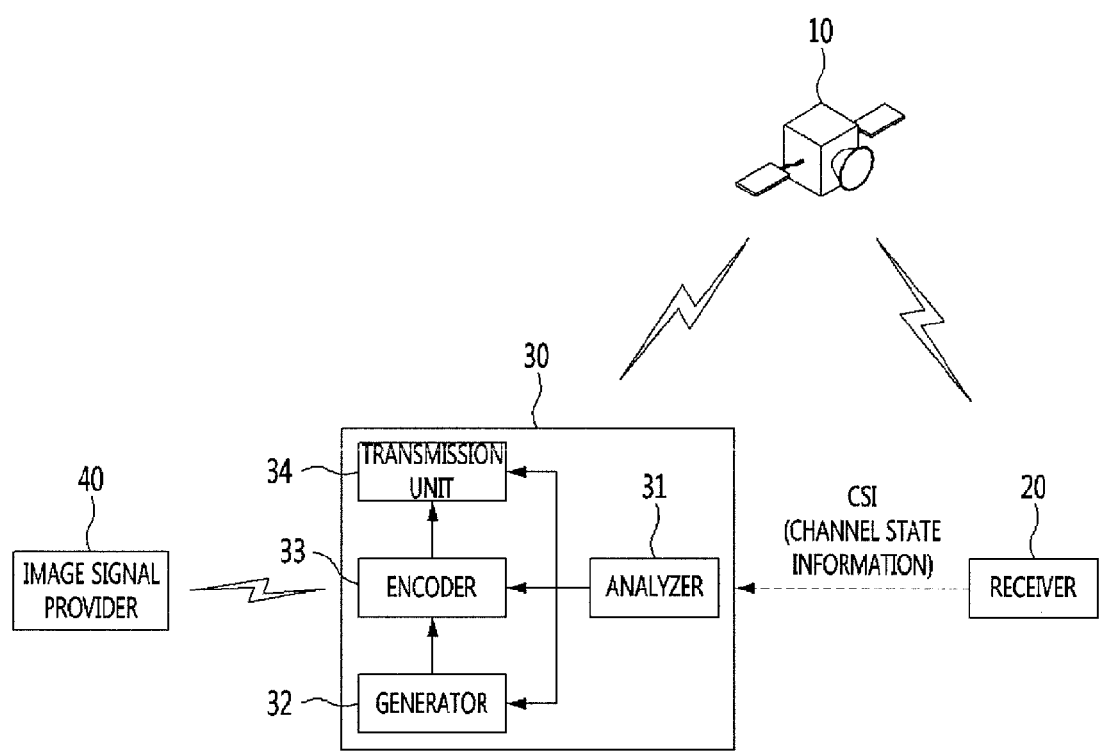
FIG. 1 is a block diagram of an adaptive coding modulation (ACM)-based simulcast transmission and reception apparatus according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an adaptive coding modulation (ACM)-based simulcast transmission and reception apparatus according to an example embodiment of the present invention. An example embodiment of the present invention will be described in detail below with reference to FIG. 1.

A satellite 10 may communicate with a receiver 20 and a transmitter 30 through a satellite communication channel and/or a satellite communication return channel, and provide an image signal received from the transmitter 30 to the receiver 20.

The receiver 20 may receive the image signal from the satellite 10, and provide the transmitter 30 with channel state information (CSI) resulting from the reception of the image signal. The CSI indicates a state of the satellite communication channel, and is generated on the basis of quality of the image signal received from the satellite 10. Specifically, a signal-to-noise ratio (SNR) and/or a carrier-to-noise ratio (CNR) of the image information received by the receiver 20 may be included in the CSI, and vary according to the state of the satellite communication channel. For example, when a region where the receiver 20 is present is in a non-rainfall state, the state of the satellite communication channel is good, and thus the SNR and/or the CNR of the image information are relatively large. On the other hand, when the region where the receiver 20 is present is in a rainfall state, the state of the satellite communication channel is poor, and thus the SNR and/or the CNR of the image information are relatively small.

Also, the receiver 20 may provide the CSI to the transmitter 30 through a wired/wireless communication channel directly connected with the transmitter 30, and provide the CSI to the transmitter 30 through the satellite communication return channel.

The transmitter 30 may perform ACM on an image signal according to a result of analyzing whether or not it is raining in the region where the receiver 20 is present on the basis of the CSI, and provide the image signal on which ACM has been performed to the receiver 20 through a single band or multiple bands. The transmitter 30 may include an analyzer 31 that analyzes whether or not it is raining in the region where the receiver 20 is present on the basis of the CSI, a generator 32 that generates an image signal of which a resolution has been adjusted on the basis of an original image signal received from an image signal provider 40 according to the analysis result of the analyzer 31, an encoder 33 that to performs ACM on the image signal generated by the generator 32 according to the analysis result of the analyzer 31, and a transmission unit 34 that provides the image signal on which ACM has been performed by the encoder 33 to the receiver 20 through a single band or multiple bands according to the analysis result of the analyzer 31.

The analyzer 31 analyzes whether the SNR and/or the CNR, which are the CSI, are greater than or equal to reference values. The analyzer 31 may determine that the region where the receiver 20 having provided the CSI is present is in the non-rainfall state when the SNR and/or the CNR are greater than or equal to the reference values, and may determine that the region where the receiver 20 having provided the CSI is present is in the rainfall state when the SNR and/or the CNR are less than the reference values. Here, the reference values may be set by an administrator of the transmission and reception apparatus, and sensitivity to the determination of whether the region is in the rainfall or non-rainfall state may be adjusted by changing the reference values. Also, the analyzer 31 may determine whether the region is in the rainfall state using the SNR alone, the CNR alone, both the SNR and the CNR, or the SNR and the CNR to which weights are given according to importance, and provide the result of determining whether the region is in the rainfall state to the generator 32, the encoder 33, and the transmission unit 34.

When the analyzer 31 analyzes that the region is in the rainfall state, the generator 32 may generate at least two image signals having different resolutions on the basis of the original image signal received from the image signal provider 40. At this time, the generator 32 may generate the image signals having ultra definition (UD), high definition (HD), and standard definition (SD) resolutions on the basis of the original image signal. For example, the generator 32 may generate an image signal having the UD resolution as one image signal and an image signal having the HD or SD resolution as the other image signal, or may generate an image signal having the 1-ID resolution as one image signal and an image signal having the SD resolution as the other image signal.

On the other hand, when the analyzer 31 analyzes that the region is in the non-rainfall state, the generator 32 may generate one image signal on the basis of the original image signal received from the image signal provider 40. At this time, the generator 32 may generate the image signal to have the UD, HD, or SD resolution on the basis of the original image signal.

When the at least two image signals having different resolutions are received from the generator 32, the encoder 33 may perform ACM on the respective image signals according to the resolutions. Also, the encoder 33 may apply a relatively high coding rate and/or a relatively high-order modulation scheme to an image signal having a relatively high resolution between the at least two image signals having the different resolutions, and apply a relatively low coding rate and/or a relatively low-order modulation scheme to an image signal having a relatively low resolution.

For example, when an HD image signal and an SD image signal having different resolutions are received, the encoder 33 may apply a low density parity check (LDPC) 3/4 coding rate and/or an 8 phase-shift keying (PSK) modulation scheme to the HD image signal having a relatively high resolution, and apply an LDPC 1/2 coding rate and/or a quadrature phase-shift keying (QPSK) modulation scheme to the SD image signal having a relatively low resolution. Also, the encoder 33 may only change a coding rate or a modulation scheme according to the resolutions of the image signals.

In this way, by applying a relatively high coding rate and/or a relatively high-order modulation scheme to an image signal having a relatively high resolution, it is possible to provide a high-resolution image signal to the receiver 20, and by applying a relatively low coding rate and/or a relatively low-order modulation scheme to an image signal having a relatively low resolution, it is possible to provide the image signal to the receiver 20 even in the rainfall state.

Also, when one image signal is received from the generator 32, the encoder 33 may to perform coding and/or modulation on the received one image signal, and apply a coding rate and/or a modulation scheme varying according to a resolution of the received image signal. For example, the encoder 33 may apply the LDPC 3/4 coding rate and/or the 8PSK modulation scheme when an HD image signal having a relatively high resolution is received, and may apply the LDPC 1/2 coding rate and/or the QPSK modulation scheme when an SD image signal having a relatively low resolution is received.

When image signals having different resolutions are received, the transmission unit 34 may provide the respective image signals to the receiver 20 through multiple bands. For example, when an HD image signal and an SD image signal are provided as two image signals, the transmission unit 34 may provide the HD image signal to the receiver 20 through one band and the SD image signal to the receiver 20 through another band.

Also, when image signals having different resolutions are received, the transmission unit 34 may provide an image signal having a relatively high resolution to the receiver 20 through the $K_a$ band, and an image signal having a relatively low resolution to the receiver 20 through the $K_u$ band. For example, when an HD image signal and an SD image signal are provided as two image signals, the transmission unit 34 may provide the HD image signal to the receiver 20 through the $K_a$ band and the SD image signal to the receiver 20 through the $K_u$ band.

Figure 3:
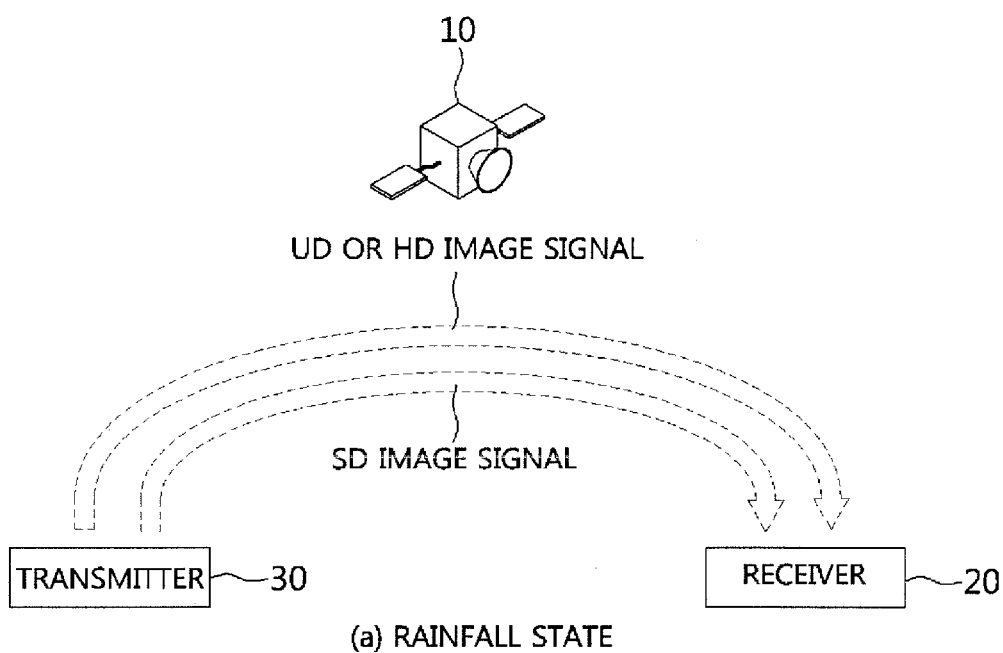
FIG. 3 is a conceptual diagram illustrating transmission states of an image signal according to an example embodiment of the present invention.
Figure 3:
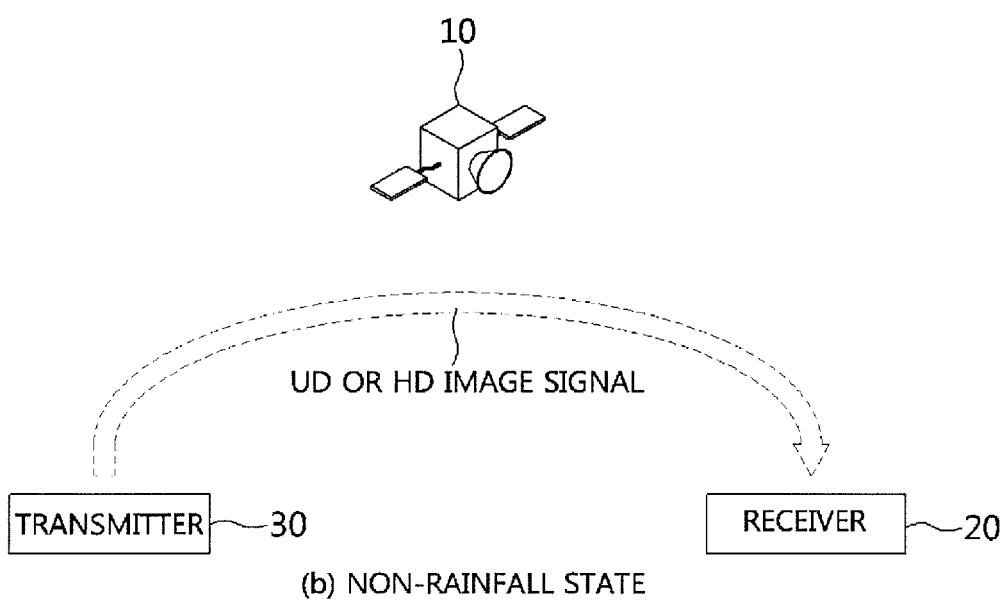

Referring to FIG. 3, which is a conceptual diagram illustrating transmission states of an image signal according to an example embodiment of the present invention, in the rainfall state, the transmitter 30 may provide a UD or HD image signal to the receiver 20 through one band, and provide an SD image signal to the receiver 20 through another band. Also, while providing a UD image signal to the receiver 20 through one band, the transmitter 30 may provide an HD image signal to the receiver 20 through another band.

When one image signal is received, the transmitter 30 may provide the image signal to the receiver 20 through a single band. At this time, the transmitter 30 may provide the image signal to the receiver 20 through the $K_a$ band or the $K_u$ band, and a used band may vary according to a resolution of the image signal. For example, the transmitter 30 may provide a high-resolution UD or HD image signal to the receiver 20 through the $K_a$ band, and provide a low-resolution SD image signal to the receiver 20 through the $K_u$ band.

Referring to FIG. 3 again, which is a conceptual diagram illustrating transmission states of an image signal according to an example embodiment of the present invention, in the non-rainfall state, the transmitter 30 may provide a UD or HD image signal to the receiver 20 through one band. Also the transmitter 30 may provide a SD image signal to the receiver 20 through one band.

As described above, on the basis of a result of analyzing whether or not it is raining in a region where the receiver 20 is present, it is possible to effectively prevent signal attenuation caused by rain by providing image signals having different resolutions through multiple bands when the region where the receiver 20 is present is in the rainfall state, and it is possible to make better use of a bandwidth by providing an image signal through a single band when the region where the receiver 20 is present is in the non-rainfall state.

Figure 2:
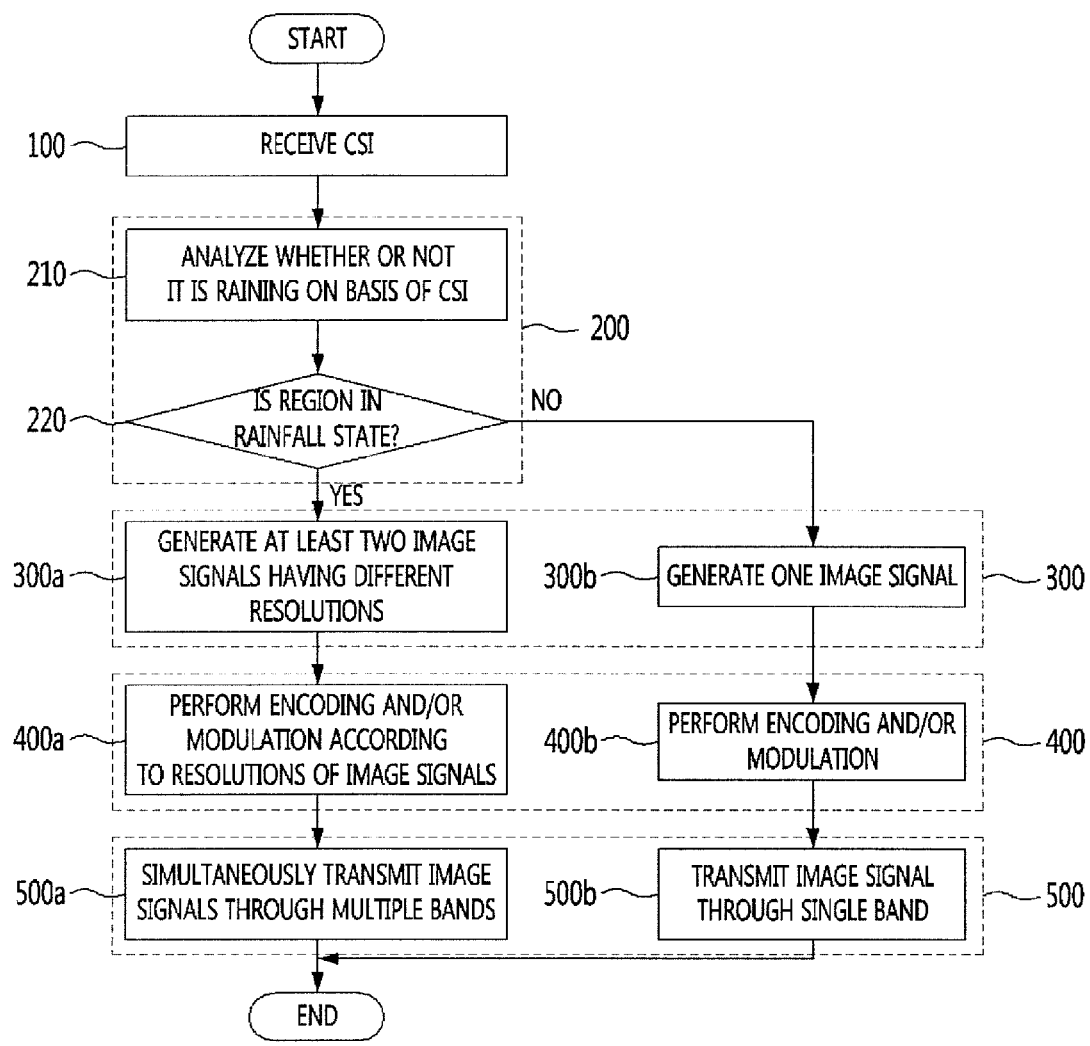
FIG. 2 is a flowchart illustrating an ACM-based simulcast transmission and reception method according to an example embodiment of the present invention.

FIG. 2 is a flowchart illustrating an ACM-based simulcast transmission and reception method according to an example embodiment of the present invention.

Referring to FIG. 2, an ACM-based simulcast transmission and reception method according to an example embodiment of the present invention includes receiving CSI (100), analyzing whether or not it is raining on the basis of the received CSI (200), generating an image signal according to the result of analyzing whether or not it is raining (300), encoding and/or modulating the image information according to the result of analyzing whether or not it is raining (400), and providing the encoded and/or modulated image signal through a single band or multiple bands according to the result of analyzing whether or not it is raining (500). Such a method may be performed by an ACM-based simulcast transmission and reception apparatus according to an example embodiment of the present invention.

In operation 100, CSI resulting from reception of an image signal is received from the receiver 20. Here, the CSI indicates a state of a satellite communication channel, and is generated on the basis of quality of the image signal received from the satellite 10. Specifically, an SNR and/or a CNR of the image information may be included in the CSI, and vary according to the state of the satellite communication channel. For example, when a region where the receiver 20 is present is in the non-rainfall state, the state of the satellite communication channel is good, and thus the SNR and/or the CNR of the image information are relatively large. On the other hand, when the region where the receiver 20 is present is in the rainfall state, the state of the satellite communication channel is poor, and thus the SNR and/or the CNR of the image information are relatively small.

Operation 200 includes operation 210 and operation 220. In operation 210, it is analyzed on the basis of the CSI whether or not it is raining in the region where the receiver 20 is present, and in operation 220, it is determined on the basis of the analysis result whether the region where the receiver 20 is present is in the rainfall state or the non-rainfall state. Specifically, in operation 200, it is analyzed whether the SNR and/or the CNR, which are the CSI, are greater than or equal to reference values. When the SNR and/or the CNR are greater than or equal to the reference values, it may be determined that the region where the receiver 20 having provided the CSI is present is in the non-rainfall state, and when the SNR and/or the CNR are less than the reference values, it may be determined that the region where the receiver 20 having provided the CSI is present is in the rainfall state. Here, the reference values may be set by an administrator of a satellite broadcasting system, and sensitivity to the determination of whether the region is in the rainfall or non-rainfall state may be adjusted by changing the reference values.

Also, in operation 200, it may be determined whether the region is in the rainfall state using the SNR alone, the CNR alone, both the SNR and the CNR, or the SNR and the CNR to which weights are given according to importance.

Operation 300 includes operation 300a and operation 300b. In operation 300a, when it is analyzed in operation 200 that the region where the receiver 20 is present is in the rainfall state, at least two image signals having different resolutions may be generated on the basis of an original image signal received from the image signal provider 40. At this time, in operation 300a, image signals having UD, HD, and SD resolutions may be generated on the basis of the original image signal. For example, two image signals having different resolutions may be generated in operation 300a. When an image signal having the UD resolution is generated as one image signal, an image signal having the HD or SD resolution may be generated as the other image signal, and when an image signal having the HD resolution is generated as one image signal, an image signal having the SD resolution may be generated as the other image signal.

On the other hand, in operation 300b, when it is analyzed in operation 200 that the region is in the non-rainfall state, one image signal may be generated on the basis of the original image signal received from the image signal provider 40. At this time, in operation 300b, the image signal may be generated to have the UD, HD, or SD resolution on the basis of the original image signal.

In operation 400a, when the at least two image signals having different resolutions are generated in operation 300, ACM may be performed on the respective image signals according to the resolutions. At this time, in operation 400a, a relatively high coding rate and/or a relatively high-order modulation scheme may be applied to an image signal having a relatively high resolution between the at least two image signals having the different resolutions, and a relatively low coding rate and/or a relatively low-order modulation scheme may be applied to an image signal having a relatively low resolution.

For example, in operation 400a, when an HD image signal and an SD image signal are generated as two image signals having different resolutions in operation 300, an LDPC 3/4 coding rate and/or an 8PSK modulation scheme may be applied to the HD image signal having a relatively high resolution, and an LDPC 1/2 coding rate and/or a QPSK modulation scheme may be applied to the SD image signal having a relatively low resolution. Also, in operation 400a, only a coding rate or a modulation scheme may be changed according to the resolutions of the image signals.

In this way, by applying a relatively high coding rate and/or a relatively high-order modulation scheme to an image signal having a relatively high resolution, it is possible to provide a high-resolution image signal to the receiver 20, and by applying a relatively low coding rate and/or a relatively low-order modulation scheme to an image signal having a relatively low resolution, it is possible to provide the image signal to the receiver 20 even in the rainfall state.

Also, in operation 400b, when one image signal is generated in operation 300, coding and/or modulation may be performed on the one image signal, and an applied coding rate and/or an applied modulation scheme may vary according to a resolution of the image signal generated in operation 300. For example, in operation 400b, the LDPC 3/4 coding rate and/or the 8PSK modulation scheme may be applied to an HD image signal, and the LDPC 1/2 coding rate and/or the QPSK modulation scheme may be applied to an SD image signal.

In operation 500a, the respective image signals on which ACM has been performed may be provided to the receiver 20 through multiple bands. For example, in operation 500a, an HD image signal may be provided to the receiver 20 through one band, and an SD image signal may be provided to the receiver through another band.

Also, in operation 500a, an image signal having a relatively high resolution may be provided to the receiver 20 through the $K_a$ band, and an image signal having a relatively low resolution may be provided to the receiver 20 through the $K_u$ band.

For example, in operation 500a, when ACM is performed on an HD image signal and an SD image signal in operation 400, the HD image signal may be provided to the receiver 20 through the $K_a$ band, and the SD image signal may be provided to the receiver 20 through the $K_u$ band.

In operation 500b, the encoded and/or modulated one image signal may be provided to the receiver 20 through a single band. At this time, in operation 500b, the image signal may be provided to the receiver 20 through the $K_a$ band or the $K_u$ band, and a used band may vary according to a resolution of the image signal. For example, in operation 500b, a high-resolution UD or HD image signal may be provided to the receiver 20 through the $K_a$ band, and a low-resolution SD image signal may be provided to the receiver 20 through the $K_u$ band.

In example embodiments of the present invention, on the basis of a result of analyzing whether or not it is raining in a region where a receiver is present, it is possible to effectively prevent signal attenuation caused by rain by providing image signals having different resolutions through multiple bands when it is analyzed that the region where the receiver is present is in the rainfall state, and it is possible to make better use of a bandwidth by providing an image signal through a single band when it is analyzed that the region where the receiver is present is in the non-rainfall state.

While the example embodiments of the present invention and their advantages have been described in detail, it should be understood that various changes, substitutions and alterations may be made herein without departing from the scope of the invention.

What is claimed is:

1. An adaptive coding modulation ACM-based simulcast transmission and reception apparatus, comprising:
    a transmitter configured to analyze whether or not it is raining in a region where a receiver is present on the basis of channel state information (CSI) provided by the receiver, encode and/or modulate an image signal according to the analysis result, and provide the encoded and/or modulated image signal through a single band or multiple bands,
    wherein the transmitter includes:
    an analyzer configured to analyze whether or not it is raining in the region where the receiver is present on the basis of the CSI;
    a generator configured to generate an image signal of which a resolution has been adjusted on the basis of an original image signal according to the analysis result of the analyzer;
    an encoder configured to encode and/or modulate the image signal generated by the generator according to the analysis result of the analyzer; and
    a transmission unit configured to provide the image signal encoded and/or modulated by the encoder through the single band or the multiple bands according to the analysis result of the analyzer.

2. The ACM-based simulcast transmission and reception apparatus of claim 1, wherein the CSI provided by the receiver includes at least one of a signal-to-noise ratio (SNR) and a carrier-to-noise ratio (CNR).

3. The ACM-based simulcast transmission and reception apparatus of claim 2 or claim 1, wherein the generator generates at least two image signals having different resolutions when the analyzer analyzes that the region where the receiver is present is in a rainfall state, and generates one image signal when the analyzer analyzes that the region where the receiver is present is in a non-rainfall state.

4. The ACM-based simulcast transmission and reception apparatus of claim 3, wherein, when the at least two image signals are generated by the generator, the encoder applies a higher coding rate and/or a higher-order modulation scheme to an image signal having a relatively high resolution between the at least two image signals in comparison with an image signal having a relatively low resolution.

5. The ACM-based simulcast transmission and reception apparatus of claim 3, wherein the transmission unit provides the at least two image signals through the multiple bands when the analyzer analyzes that the region where the receiver is present is in the rainfall state, and provides the one image signal through the single band when the analyzer analyzes that the region where the receiver is present is in the non-rainfall state.

6. An adaptive coding modulation (ACM)-based simulcast transmission and reception method, comprising:
    receiving channel state information (CSI) resulting from reception of an image signal from a receiver;
    analyzing whether or not it is raining in a region where the receiver is resent on the basis of the CSI;
    generating an image of which a resolution has been adjusted on the basis of an or image signal according to the result of analyzing whether or not it is raining;
    encoding and/or modulating the image signal of which the resolution has been adjusted according to the result of analyzing whether or not it is raining; and
    providing the encoded and/or modulated image signal through a single band or multiple bands according to the result of analyzing whether or not it is raining,
wherein generating the image signal of which the resolution has been adjusted includes:
    generating at least two image signals having different resolutions when it is analyzed that the region where the receiver is present is in a rainfall state; and
    generating one image signal when it is analyzed that the region where the receiver is present is in a non-rainfall state.

7. The ACM-based simulcast transmission and reception method of claim 6, wherein receiving the CSI includes receiving the CSI including at least one of a signal-to-noise ratio (SNR) and a carrier-to-noise ratio (CNR).

8. The ACM-based simulcast transmission and reception method of claim 7 or claim 6, wherein encoding and/or modulating the image signal of which the resolution has been adjusted includes, when the at least two image signals are generated, applying a higher coding rate and/or higher-order modulation scheme to an image signal having a relatively high resolution between the at least two image signals in comparison with an image signal having a relatively low resolution.

9. The ACM-based simulcast transmission and reception method of claim 7 or claim 6, wherein providing the encoded and/or modulated image signal through the single band or the multiple bands includes
    providing the at least two image signals through the multiple bands when it is analyzed that the region where the receiver is present is in the rainfall state, and
    providing the one image signal through the single band when it is analyzed that the region where the receiver is present is in the non-rainfall state.

* * * * *